United States Patent [19]
Keskitalo et al.

[11] Patent Number: 5,966,670
[45] Date of Patent: *Oct. 12, 1999

[54] METHOD FOR TRANSMITTING A PILOT SIGNAL, AND A CELLULAR RADIO SYSTEM

[75] Inventors: Ilkka Keskitalo, Oulu; Peter Muszynski; Petri Jolma, both of Espoo; Jaana Laiho-Steffens, Veikkola, all of Finland

[73] Assignee: Nokia Telecommunications Oy, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/765,843
[22] PCT Filed: May 23, 1996
[86] PCT No.: PCT/FI96/00291
    § 371 Date: Jan. 24, 1997
    § 102(e) Date: Jan. 24, 1997
[87] PCT Pub. No.: WO96/37969
    PCT Pub. Date: Nov. 28, 1996

[30] Foreign Application Priority Data

May 24, 1995 [FI] Finland ..................................... 952534

[51] Int. Cl.⁶ .............................. H04B 1/38; H04M 1/00
[52] U.S. Cl. ........................................... 455/562; 455/434
[58] Field of Search ..................................... 455/561, 562, 455/422, 424, 517, 25, 73, 129, 522, 434, 515; 370/320, 342; 342/368, 371, 372, 360, 367, 359

[56] References Cited

U.S. PATENT DOCUMENTS

| | | |
|---|---|---|
| 5,109,390 | 4/1992 | Gilhousen et al. . |
| 5,267,261 | 11/1993 | Blakeney et al. . |
| 5,576,717 | 11/1996 | Searle et al. ............................. 455/562 |
| 5,596,333 | 1/1997 | Bruckert ................................... 455/522 |
| 5,603,089 | 2/1997 | Searle et al. ............................. 455/562 |
| 5,708,441 | 1/1998 | Kanai ....................................... 342/359 |

FOREIGN PATENT DOCUMENTS

| | | |
|---|---|---|
| 0647979 | 4/1995 | European Pat. Off. . |
| 9509490 | 4/1995 | WIPO . |

OTHER PUBLICATIONS

TIA/EIA/IS–95, 1995, pp. 6–83 & 6–84, 6–95–6–98, 6–147–6–158, 6–197–6–202, 7–1 & 7–2, 7–21 & 7–22.

Naguib et al., "Performance of CDMA Cellular Networks With Base–Station Antenna Arrays," May 18, 1994, pp. 88–100.

*Primary Examiner*—Nguyen Vo
*Attorney, Agent, or Firm*—Pillsbury Madison & Sutro LLP

[57] ABSTRACT

In a cellular radio system having in each of a plurality of cells at least one base station communicating with mobile stations located within its area, the base stations each transmit a pilot signal to the mobile stations. At least one of the base stations, transmits to the mobile stations by transmitting a pilot signal by using a rather narrow changing antenna beam. The angle of the greatest gain of the antenna beam is controlled in such a way that the antenna beam sweeps the cell area. The mobile stations can use the pilot signal in the identification of a base station, and as an indicator of a need for handover, without the continuous reception of the pilot signal in the subscriber equipment, and without a need to transmit the pilot signal with a higher transmission power than the other signals.

12 Claims, 4 Drawing Sheets

METHOD FOR TRANSMITTING A PILOT SIGNAL, AND A CELLULAR RADIO SYSTEM

This application is the national phase of international application PCT/FI96/00291, filed May 23, 1996 which designated the U.S.

BACKGROUND OF THE INVENTION

The invention relates to a method for transmitting a pilot signal in a cellular radio system, which comprises in each cell at least one base station communicating with mobile stations located within its area, and in which method the base stations transmit a data signal in the downlink transmission direction by using radiation patterns changing in time, and which base stations transmit a pilot signal to the mobile stations.

The present invention is applicable for use in a data transmission system applying any multiple access method, but especially in a cellular system utilizing code division multiple access. Code division multiple access (CDMA) is a multiple access method, which is based on the spread spectrum technique and which has been applied recently in cellular radio systems, in addition to the prior FDMA and TDMA methods. CDMA has several advantages over the prior methods, for example spectral efficiency and the simplicity of frequency planning. An example of a known CDMA system is disclosed in the broadband cellular radio standard EIA/TIA IS-95.

In the CDMA method, the narrow-band data signal of the user is multiplied to a relatively wide band by a spreading code having a considerably broader band than the data signal. In known test systems, bandwidths such as 1.25 MHz, 10 MHz and 25 MHz have been used. In connection with multiplying, the data signal spreads to the entire band to be used. All users transmit by using the same frequency band simultaneously. A separate spreading code is used over each connection between a base station and a mobile station, and the signals of the different users can be distinguished from one another in the receivers on the basis of the spreading code of each user.

Matched filters provided in the receivers are synchronized with a desired signal, which they recognize on the basis of a spreading code. The data signal is restored in the receiver to the original band by multiplying it again by the same spreading code that was used during the transmission. Signals multiplied by some other spreading code do not correlate, in an ideal case, and are not restored to the narrow band. They appear thus as noise with respect to the desired signal. The spreading codes of the system are preferably selected in such a way that they are mutually orthogonal, i.e. they do not correlate with each other.

In a CDMA cellular radio system, it is possible to use a so-called pilot channel in the transmission direction of a base station to subscriber equipments, i.e. in the downlink direction. A pilot channel is a signal which is transmitted with a specific spreading code and utilizing the same frequency band on which the actual traffic channels are situated, the pilot signal being distinguishable from them only on the basis of the spreading code. The pilot signal is a channel known and listened to by all subscriber equipments within the cell area, and it is used, for example, in power measurements and in the generation of a coherent phase reference. Each base station of the system transmits its own pilot signal on the basis of which the subscriber equipments can distinguish the transmissions of different base stations from each other.

U.S. Pat. No. 5,109,390, which is incorporated herein by reference, and the aforementioned IS-95 standard disclose a prior art CDMA cellular system utilizing a separate pilot channel that is transmitted to the same coverage area with the data signals.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. In the CDMA, the multipath propagation can be exploited in the reception of the signal in the same way as diversity. The receiver generally utilized in a CDMA system is a multi-branch receiver structure where each branch is synchronized with a signal component which has propagated along an individual path. Each branch is an independent receiver element, the function of which is to compose and demodulate one received signal component. In a conventional CDMA receiver, the signals of the different receiver elements are combined advantageously, either coherently or incoherently, whereby a signal of good quality is achieved.

CDMA systems can also apply a soft handover wherein a mobile station may simultaneously communicate with two or more base stations by utilizing macrodiversity. The connection quality of the mobile station thus remains high during the handover and the user does not notice a break in the connection.

Interference caused by other connections in the desired connection thus appears in the receiver as noise that is evenly distributed. This is also true when a signal is examined in an angular domain according to the incoming directions of the signals detected in the receivers. The interference caused by the other connections in the desired connection thus also appears in the receiver as distributed in the angular domain, i.e. the interference is rather evenly distributed in the different incoming directions.

The capacity of the CDMA system, which can be measured by means of spectral efficiency, has been further improved with sectorization. A cell is then divided into sectors of a desired size that are serviced by directional antennas. The mutual noise level caused by the mobile stations can thus be reduced significantly in the base station receiver. This is based on the fact that on average the interference is evenly distributed between or among the different incoming directions, the number of which can thus be reduced by means of sectorization. The sectorization can naturally be implemented in both transmission directions. The advantage provided in the capacity by the sectorization is proportional to the number of the sectors.

A sectorized cell may also utilize a softer handover, wherein a mobile station performs a handover from one sector to another by communicating simultaneously with both sectors. Even though soft handover improves the connection quality and sectorization increases the system capacity, the movement of the mobile stations naturally leads to the stations performing several handovers from one sector to another. This loads the processing capacity of the base station controller. Several soft handovers also produce a situation where several mobile stations communicate simultaneously with more than one sector (usually two sectors), whereby the increased capacity provided by the sectorization is lost, as a signal of a mobile station is audible in a wide sector.

The multiple access interference of CDMA systems has also been reduced by means of different known multiple access interference cancellation (IC) methods and multi-user detection (MUD). These methods are best suited for reducing the interference produced within the user's own cell, and the system capacity can thus be increased to about double compared to a system implemented without interference cancellation. However, these methods do not provide a significant improvement in the size of the coverage area of the base station as compared to known technology, i.e. the cell size is not significantly altered with the application of these methods. Also, the IC/MUD techniques are complicated to realize, wherefore they have mainly been developed in the uplink direction.

Another method that has been developed is an SDMA (Space Division Multiple Access) method wherein the users are distinguished from one another on the basis of their location. This is performed in such a way that the beams of the receiver antennas at the base station are adjusted to the desired directions according to the location of the mobile stations. For this purpose, the system uses adaptive antenna groups, i.e. phased antennas, and the processing of the received signal, by means of which the mobile stations are tracked.

The use of the SDMA in connection with the CDMA provides several advantages over the prior methods, such as sectorization. If the sector beams in the sectorization are narrowed in order to increase the spectral efficiency, the number of the handovers to be performed from one sector to another also increases. This in turn excessively increases too much the calculation capacity required in the base station controller.

In connection with the application of the SDMA, the background art is illustrated in A. F. Naguib, A. Paulraj: *Performance of CDMA Cellular Networks With Base-Station Antenna Arrays* (Proc. International Zürich Seminar on Digital Communications, pp. 87–100, Zürich, Switzerland, March 1994), which is incorporated herein by reference. In the SDMA system a signal is thus received by means of an antenna group, and the received signal is shaped by means of digital signal processing in such a way that the directivity patterns of the antennas are suitable for the stages following the shaping in the receiver. In prior art arrangements, the received signal is shaped in order to maximize the signal-to-interference ratio of the desired signal. The received signal is thus shaped in such a way that the directivity pattern of the antenna group minimizes the interference caused by the other connections in the desired signal. In the arrangement according to the aforementioned reference, each detected signal component is subjected to individual beam shaping, i.e. the impulse response must be known before the shaping.

When data signals, i.e. traffic channels, are transmitted to mobile stations according to the SDMA principle by using changing beams, the use of the pilot signal will be problematic in the prior art arrangements. In known methods, the pilot signal has thus been transmitted continuously and together with the traffic channels so that the pilot could be used in the mobile stations for the identification of base stations and as an indicator of a need for handover. The conventional manner of transmitting a pilot signal restricts the cell coverage area, which could be larger in connection with changing antenna beams.

The deficiency in the antenna gain of a pilot signal transmitted with a known method must be compensated for with a higher transmit power or by increasing the processing gain in the subscriber terminals.

SUMMARY OF THE INVENTION

The purpose of the present invention is to realize a method for transmitting a pilot signal in connection with adaptive antenna beams in such a way that the pilot signal does not restrict the cell coverage area. The purpose of the invention is to implement the transmission of the pilot signal in such a way that the mobile stations can use the pilot signal in the identification of a base station and as an indicator of a need for handover, without the continuous reception of the pilot in the subscriber equipments, and without a need to transmit the pilot signal with a higher transmit power than the other signals.

This is achieved with a method of the type described in the foregoing BACKGROUND section, characterized in that a rather narrow changing antenna beam is used in the transmission of the pilot signal, and that the angle of the greatest gain of the antenna beam is directed in such a way that the antenna beam sweeps the cell area.

The invention also relates to a cellular radio system comprising in each cell at least one base station communicating with mobile stations located within its area, and which base stations transmit a pilot signal to the mobile stations, and which system comprises at least one base station, which transmits to the mobile stations by using radiation patterns that change in time. The cellular radio system according to the invention is characterized in that the system comprises at least one base station, which comprises means for transmitting a pilot signal by using a rather narrow changing antenna beam, and means for controlling the angle of the greatest gain of the antenna beam in such a way that the antenna beam sweeps the cell area.

The method according to the invention helps avoid the problems caused by the transmission of a pilot signal in connection with adaptive antenna beams. A pilot signal implemented in the manner according to the invention does not restrict the cell size in the same way as the previous methods, and the use of the antenna beams that change in time is as efficient as possible in the transmission of traffic channels.

In the arrangement of mobile antenna beams according to the invention, considerably better spectral efficiency is achieved when compared to the conventional cellular systems, including systems applying the CDMA method and system according to the present invention potentially or actually. The method increases both the number of the channels used by a factor of 10 to 100, and the size of the coverage area of the base station by a factor of 5 to 10. This is based on that fact that the effect of the interference caused by the other users decreases substantially in practices of the method and uses of the system according to the invention, and, since the CDMA is an interference-limited method, the number of the users can be increased. Secondly, the search according to the invention for advantageous signal components in the angle-of-arrival-time domain is technically advantageous to implement.

According to a preferred embodiment of the invention, the signal processing can be performed digitally on the base band, whereupon the antenna beams can be oriented directly to the desired directions by means of the phasing of the received signal.

In the arrangement according to the invention, the pilot signal can be transmitted in the cell by means of either one or several antenna beams in such a way that the antenna beams do not overlap.

BRIEF DESCRIPTION OF THE DRAWINGS

In the following, the invention will be described in greater detail with reference to the examples according to the accompanying drawings, in which.

DETAILED DESCRIPTION

In the following, the method and receiver according to the invention will be described in greater detail using the CDMA system as an example, but not restricting the description thereto, however, since the invention is also applicable in connection with other multiple access methods, as will be evident for a person skilled in the art on the basis of the description below.

Figure 1:
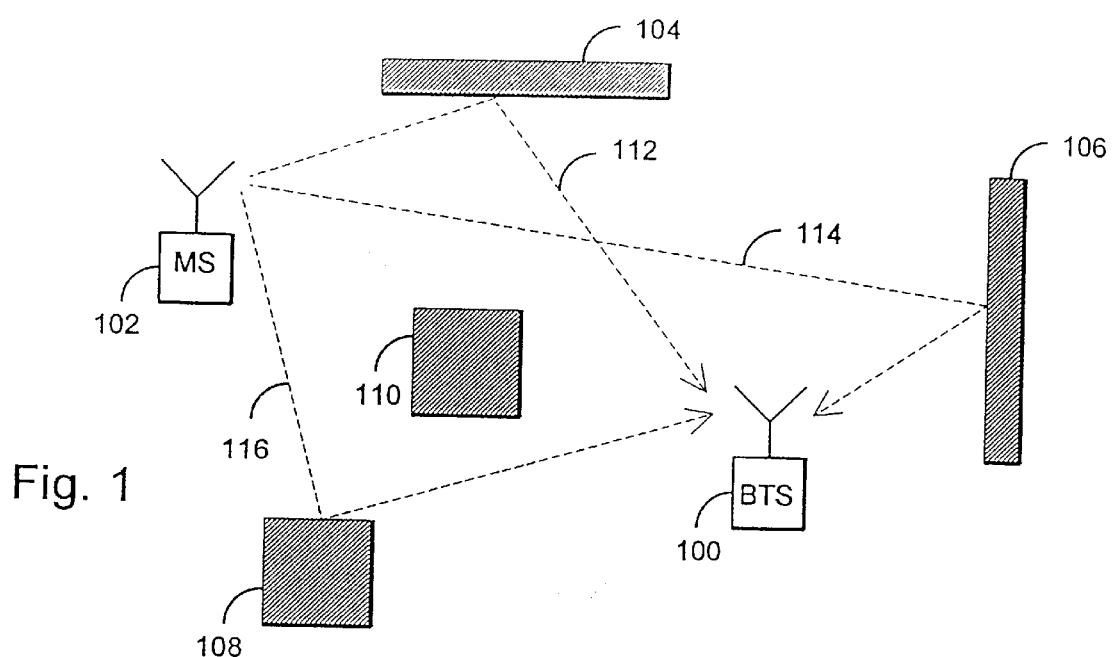
FIG. 1 illustrates the multipath propagation of a signal between a mobile station and a base station.

FIG. 1 illustrates the typical multipath propagation of a transmitted signal in a cellular system. The figure shows a base station 100 and a mobile subscriber equipment 102 communicating with the base station. A characteristic feature of cellular radio systems is that the mobile stations are surrounded by surfaces that reflect and scatter radiowaves. Such surfaces may be, for example, buildings and walls formed by the nature, such as mountains and hills. Mobile stations typically transmit with an omnidirectional antenna pattern. The figure illustrates a few rays 112, 114, 116 originating from a mobile station. The surfaces 104, 108 situated close to the mobile station 102 reflect the transmitted signal, which therefore arrives at the antenna of the base station 100 along several different paths, but the differences in delay between and among the respective signal components, is rather small, however. The reflecting surfaces situated further from the mobile station, such as larger buildings and mountains, denoted in this figure by numeral 106, produce signal components 114 which arrive at the base station 100 several, even dozens of microseconds later. There may also be obstacles 110 in the terrain that prevent a direct connection between the mobile station and the base station.

Figure 2A:
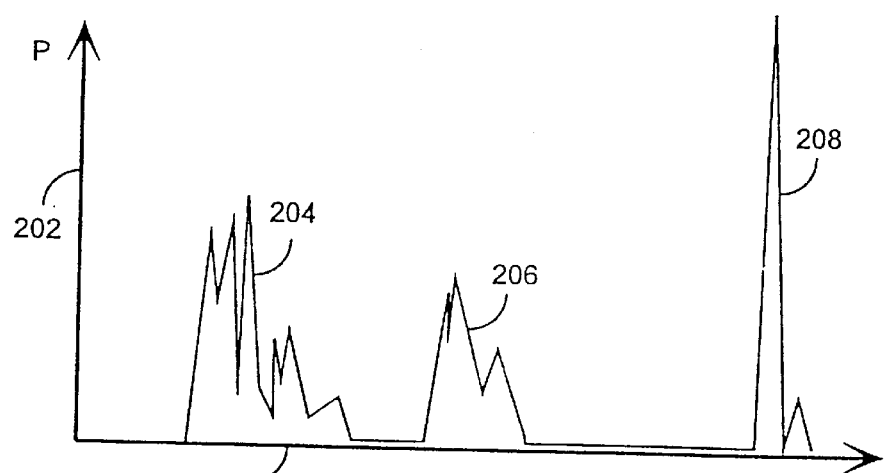
FIG. 2a illustrates, on a time domain, the scattering caused by the multipath propagation of a signal.

FIG. 2a illustrates, in regard to the time domain, an example of a momentary delay of signal components caused by the multipath propagation of the signal at a base station receiver. The horizontal axis 200 of the schematic figure shows the time and the vertical axis 202 shows the power of the received signal. In the example of FIG. 2a, the base station receiver has detected three groups of signal components 204, 206, 208 which have arrived at the receiver at different times and among which the component 208 is significantly more delayed than the others.

Figure 2B:
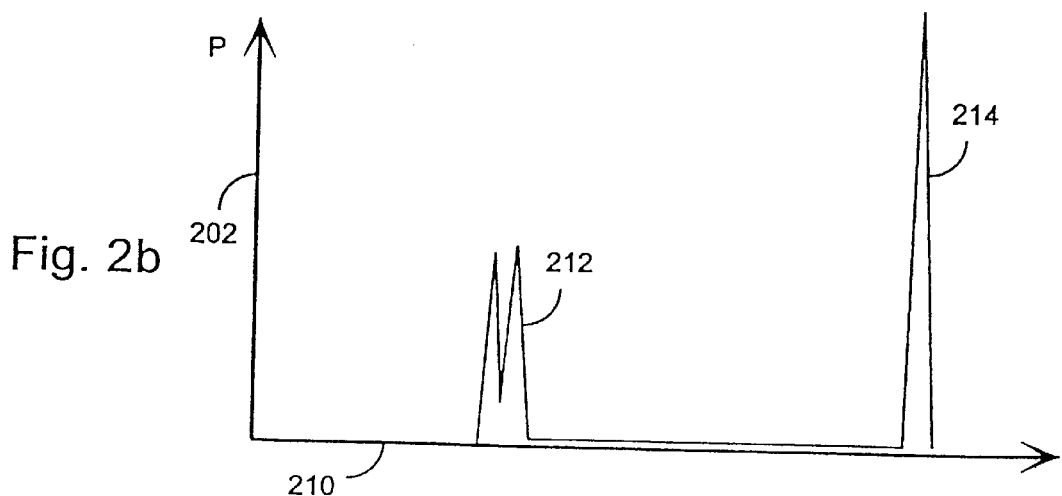
FIG. 2b illustrates, on the angle-of-arrival domain, the scattering caused by the multipath propagation of a signal.

As the example of FIG. 1 shows, the different signal components arrive not only at different times but also from different directions. It can thus be said that the signal scatters not only in the time domain, but also in the angular domain, which can be described by the angle of arrival (AoA) of the signal. FIG. 2b illustrates an example of a momentary scattering as a function of the angle of arrival, caused by the multipath propagation of the signal, at the base station receiver. The vertical axis 202 of FIG. 2b shows the power of the received signal component, and the horizontal axis 210 shows the angle of arrival. In the example of FIG. 2b, the signal components 212, 214 arrive from two directions.

In large cells, so-called macrocells, wherein the base station antennas are situated comparatively high above the local terrain, the signal components generally arrive at the antenna with only a few different angles of arrival, which are usually approximate the spatial disposition of a direct ray between -the mobile station and the base station. In small microcells, where the base station antennas are usually situated below the roofs of buildings, the angles of arrival of the signal components are found to show far greater dispersion, since, in the same way as the mobile stations, the base stations of microcells are often surrounded by several reflecting surfaces situated near by.

The concept of multipath propagation has been described above in relation to the uplink transmission direction. It is believed to be clear that a corresponding phenomenon also occurs in the opposite downlink direction. It can also be stated that the multipath routes are mainly symmetrical in both directions, since the scattering and reflection are not greatly dependent on the frequency. However, it should be noted that fast signal fadings are mutually independent in different transmission directions. Therefore, if the base station detects a signal component that has arrived from the mobile station at the angle of arrival of $\alpha_0$, transmitting a signal with the same angle $\alpha_0$ guides the signal in the direction of the mobile station, except for fast fadings.

On the basis of the above, it can be stated that the multipath propagating environment typical of cellular systems leads, in the base stations, to the reception of a signal which is distributed in time into several components that are delayed differently and in the angular domain into components arriving from several different directions. Both distribution profiles vary in time since the subscriber equipments move, but the variation is rather slow, i.e. substantial changes occur over the spans of time intervals having durations on the order of a few seconds, and the profiles can be synchronized with and they can be monitored.

The received signal components are thus characterized by the multidimensionality of the type described above that is illustrated above with the time-angular domain, i.e. ($\alpha$, $\tau$) domain, and that can be utilized in the base station according to the invention for improving the detection of the signal to be received. In the method according to the invention, the best signal components of the received signal are searched for in the multidimensional signal domain, the receiver being controlled by means of the components in such a way that the detected components can be (preferably) combined, and detected. The most simple standard for the signal quality can be the received power level, but also other standards can be used, for example the signal-to-noise ratio.

Figure 4:
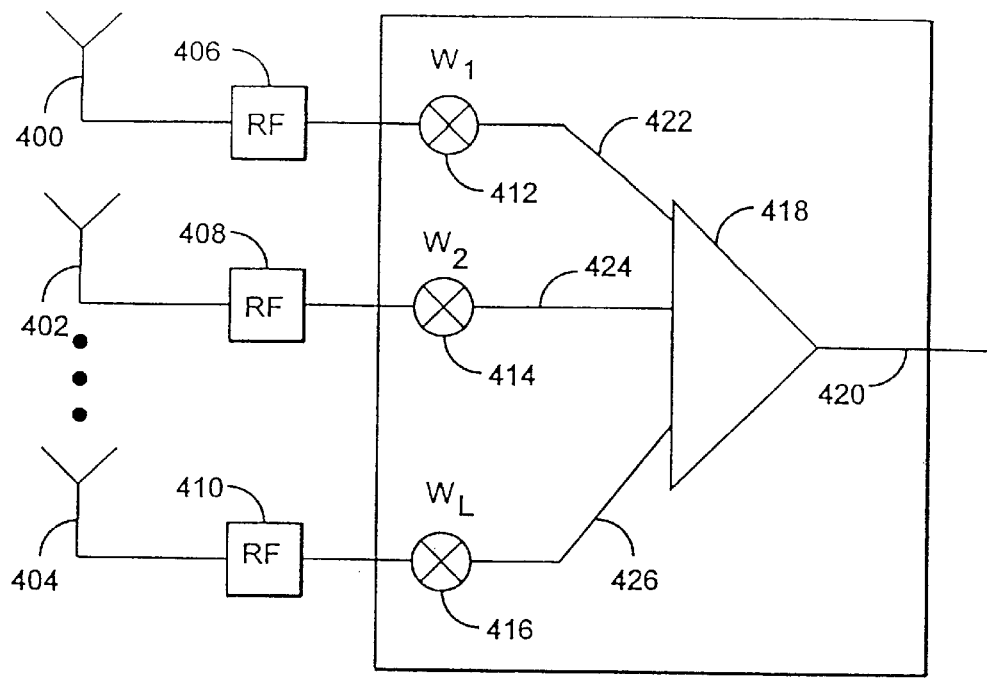
FIG. 4 shows a possible implementation of an adaptive antenna group.

The receiver according to the invention utilizes an adaptive antenna group, which is an antenna group consisting of several different elements. FIG. 4 illustrates a possible implementation of an adaptive antenna group, which can be applied in connection with the first preferred embodiment of the invention. The antenna group comprises L antenna elements 400, 402, 404, which may be, for example, omnidirectional antennas.

Each antenna element is connected to radio-frequency parts 406, 408, 410, which convert the received signal into an intermediate frequency and sample the signal into (I,Q) components according to known technology. The obtained complex samples are then multiplied by corresponding complex weighting coefficients $w_i$, wherein i=1, . . . ,L, in multipliers 412, 414, 416. The samples 422, 424, 426 that have thus been multiplied are applied via an adder 418 to other parts of the receiver.

The complex weighting coefficients $w_i$ are selected according to an algorithm, which is usually adaptive, in such a way that an antenna pattern of the desired shape is achieved. This manner of shaping the received signal can be called digital phasing of the signal, since it is performed on a signal digitized on the base band, but due to this shaping the received signal antenna gain can be oriented in the desired directions. An antenna group as such may comprise either directional or omnidirectional antenna elements. Phasing the signal obtained from the different antennas and combining the phased signals produces kind of virtual antenna beams into the desired directions. A corresponding treatment can also be performed on the signal to be transmitted, whereby a desired radiation pattern can be achieved.

Figure 3:
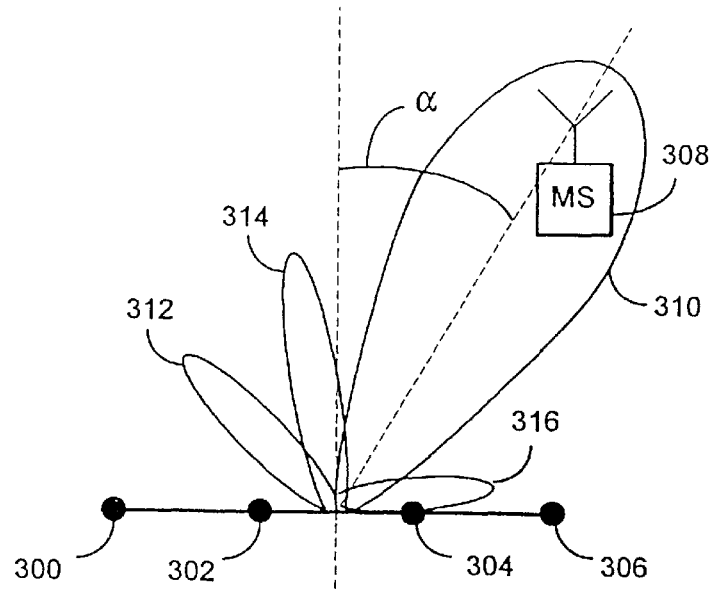
FIG. 3 illustrates a possibility of orienting the beam of the base station antennas towards the mobile station.

FIG. 3 illustrates how an antenna group consisting of an evenly spaced linear group comprising four elements 300, 302, 304, 306 produces a strong directed beam 310 with the angle of arrival of $\alpha$ towards a mobile station 308. A group of smaller side beams 312 to 316 are also formed. This directivity can thus be implemented with the signal phasing without the antennas as such being directional.

In the arrangement according to the invention, the multiple access interference of the receiver is reduced with antenna beams that are directed in the angular domain and that are produced by means of a new type of receiver applying time-angle diversity. In the arrangement according to the invention, the angles of arrival measured from the received signal can also be used in the transmission direction, whereby the connection quality is improved in both transmission directions.

In the following, the first preferred embodiment of the invention, which relates to applying the digital phasing of the received signal in the CDMA system, will be described first.

The receiver applying time-angle diversity used at the base station comprises digital receiver means that can monitor the received signal components in the two-dimensional $(\alpha, \tau)$ domain and demodulate the desired signal components. Before the demodulation, the received digitized signal samples are subjected to phasing by means of which the antenna gain of the received signal is oriented in the desired signal incoming directions. In the preferred embodiment, the antenna beams produced by the phasing are beams having a predetermined shape that is determined by the weighting coefficients $w_i$ and the antenna geometry. These coefficients can easily be calculated for each angle of the greatest gain if the shape of the antenna beam as such remains constant. Therefore, the phasing can be adjusted rapidly since it is only dependent on one parameter, i.e. the angle of arrival $\alpha$.

In the method according to the invention, there is no need to apply known complicated techniques, such as MUSIC, for estimating the angle of arrival or adaptive algorithms, such as LMS and DMI. Even though these algorithms enable the calculation of the optimal beam shape for the signal to be received, so that the signal-to-noise ratio of the desired signal can be maximized by directing the zero points of the antenna pattern towards the sources of interference, this is not necessary in connection with the CDMA system since, as described above, in the CDMA system the interference signal is distributed to resemble noise without having any clear directions of interference source. Therefore, it is sufficient in an environment with evenly distributed interference that the angles of the greatest gain of the antenna beams having a predetermined shape are pointed in the directions from which the best signal components are received. This enables the implementation of a simpler receiver compared to the prior art.

In the method according to the invention, the receiver thus searches for the desired signal components in the $(\alpha, \tau)$ domain. This is performed by cross-correlating the received spread-spectrum signal with the desired spreading code and by comparing the obtained measurement results with the threshold values given. The search can be understood as a sweep of an antenna beam over the given area, simultaneously performing the measurement of the channel impulse response and the collection of the signal energy of the terminal equipments received from each direction. The receiver thus detects the direction and code phase of the. reception of the best signals and allocates a required number of demodulation means for synchronizing with and receiving these signal components. The received demodulated signal components can be combined in the receiver, which is preferred. The search for the best signal components is performed continuously and the allocation of the demodulation means is changed, if necessary.

The receiver thus knows at all times the directions from which the best signal components from the mobile stations are received. This information can also be used in the base station equipment according to the invention in the downlink direction. This may be performed, for example, in such a manner that the controller of the transmitter-receiver informs the transmitter unit of the directions where significant signal components have been detected. The transmitter unit may phase the signal to be transmitted with the adaptive antenna group in such a way that the angles of the greatest gain of the antenna beams point in the desired directions. There may be one or more transmission beams, and their number may also differ from the number of the receiver beams.

This method provides considerable interference cancellation also in the downlink direction. The antenna group used in the transmission may be the same as the antenna group used in the reception. It may also be a separate antenna group. The signal phasing is performed in the same way as during the reception with the weighting coefficients.

The arrangement according to the invention may use, for example, prior art mobile stations, which continuously perform measurements on the connection quality from the signal they have received from the base station. This information may comprise data concerning the number of the signal components the mobile station has received. The arrangement according to the invention may apply a method of utilizing the results of the connection quality measurements performed by the mobile station when the beams of the transmission antennas are directed in the downlink direction.

The mobile station transmits the measurement results it has collected to the base station. On the basis of the information received from the mobile station and the measurements it has performed itself, the base station may vary the number, shape or direction of the antenna beams it uses for the transmission of the signal intended to the mobile station. These changes can be implemented gradually, so that the mobile station can follow the changing signal.

The base station may also use the connection quality information it has received from the mobile station for adjusting the transmit power of each antenna beam, if the measurement results show that the aforementioned measures do not improve the signal quality in the mobile station.

One advantage of the method described above is that, for example in a difficult fading situation, the mobile station may transmit to the base station a request to change the parameters of the antenna beams used in the signal transmission, for example the direction, shape and number, whereby the quality of the signal received by the mobile station can be improved rapidly.

The prior art CDMA systems thus use a pilot signal that is transmitted by each base station and that is used in the identification of base stations, in power measurement and for enabling coherent reception in a mobile station. In known systems, a pilot signal that is a data-unmodulated spreading-coded signal is transmitted to the coverage area of the base station continuously in the same way as the actual traffic channels.

In the system according to the invention, a pilot signal is transmitted using a relatively narrow antenna beam, and the angle of the greatest gain of this antenna beam is directed in such a way that the antenna beam sweeps the cell area. The antenna beam is controlled by phasing the signal to be transmitted with the antenna group in the above-described manners. Thus the antenna beam comprising the pilot signal sweeps the cell like a lighthouse, and the transmission of a continuous pilot to the entire cell area can be avoided. The pilot can also be transmitted with a plurality of sweeping antenna beams, which are phased in such a way that they do not overlap. The base station informs the mobile stations on a control channel about the time when the pilot channel sweeps each area.

The transmission of the pilot channel can also be proportioned to the frame or multiframe structure of the base station, whereupon the pilot signal is transmitted in the same place of the frame structure or alternatively by sliding it over the frame structure every time with a certain phasing. In such a case, there is no need to separately inform the terminal equipments of the moment when the pilot signal is transmitted, but once a terminal equipment has received a pilot signal, it thereafter knows when the pilot signal will be transmitted.

Figure 5:
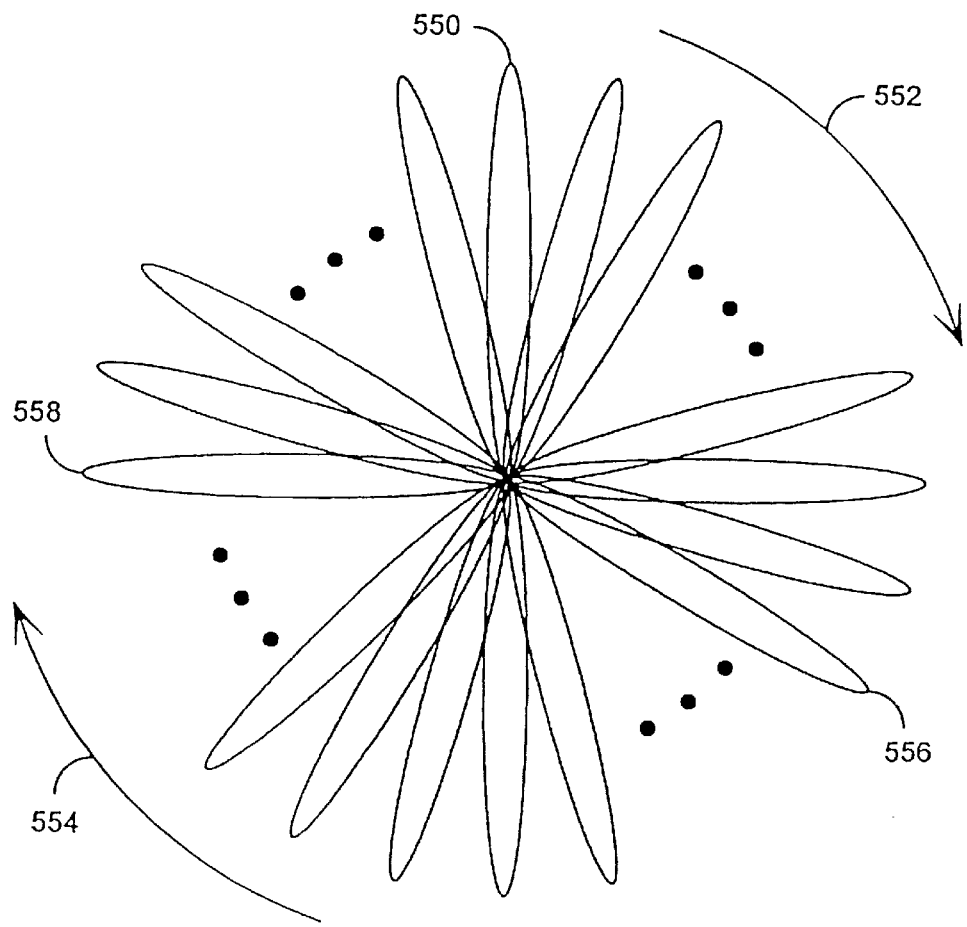
FIG. 5 illustrates an example of the method according to the invention for transmitting a pilot channel.

The method is illustrated in the example of FIG. 5, where the area of the base station is assumed to be circular and the base station to be situated in the center of that area. However, the invention can also be applied, for example, in a sector-shaped coverage area. In the example illustrated in FIG. 5, the base station transmits a pilot channel with a narrow antenna beam 550, which sweeps the cell area in the manner shown by the arrows 552, 554.

The transmission of the pilot channel can also be implemented in such a way that the channel is transmitted in the form of several narrow beams transmitted simultaneously. In the case of FIG. 5, the base station can transmit the pilot channel, for example with the beams 550, 556, 558, each of which rotates in the same direction with the same angular speed, whereby they do not overlap.

Due to reflections occurring over the radio path, the radiation pattern of an antenna beam is not accurately specified, but, in practice, the (or each) antenna beam is substantially narrower than the total area of the cell.

Since the pilot signal is thus not continuously ordinarily sensible everywhere in the cell, the measurement of the pilot signal in the mobile stations has to be implemented in such a way that a momentary undetectability of the pilot signal does not immediately produce a handover message. The mobile station should thus know which base station uses the technique of sweeping to transmit a pilot signal and the time when each pilot signal sweeps the location area of the mobile station. This is realized in the arrangement according to the invention in such a way that the base station forwards, as to a general control channel, information on how often or at which intervals the beam comprising the pilot channel travels over the cell. This information, which will be denoted below with the parameter t period, depends on the speed of rotation of the antenna beam and on the number of the antenna beams used. Since a mobile station must regularly measure the pilot signals of the surrounding base stations while maintaining active communication with at least one base station, the mobile station should know the t_period parameters of all the neighboring base stations.

The mobile stations also monitor the pilot channels of the base stations other than the one with which they communicate. In order to avoid a situation where a mobile station should measure several pilot signals simultaneously, the t_period parameters used by adjacent base stations can be defined differently. Another alternative is to divide the measuring time among several pilot channels. The rotation of the pilot channel beams of adjacent base stations can also be synchronized by using suitable phasing so that no overlapping occurs. This can be taken into account in network planning. If the network is synchronized, the aforementioned t_period is the same for every base station.

Figure 6:
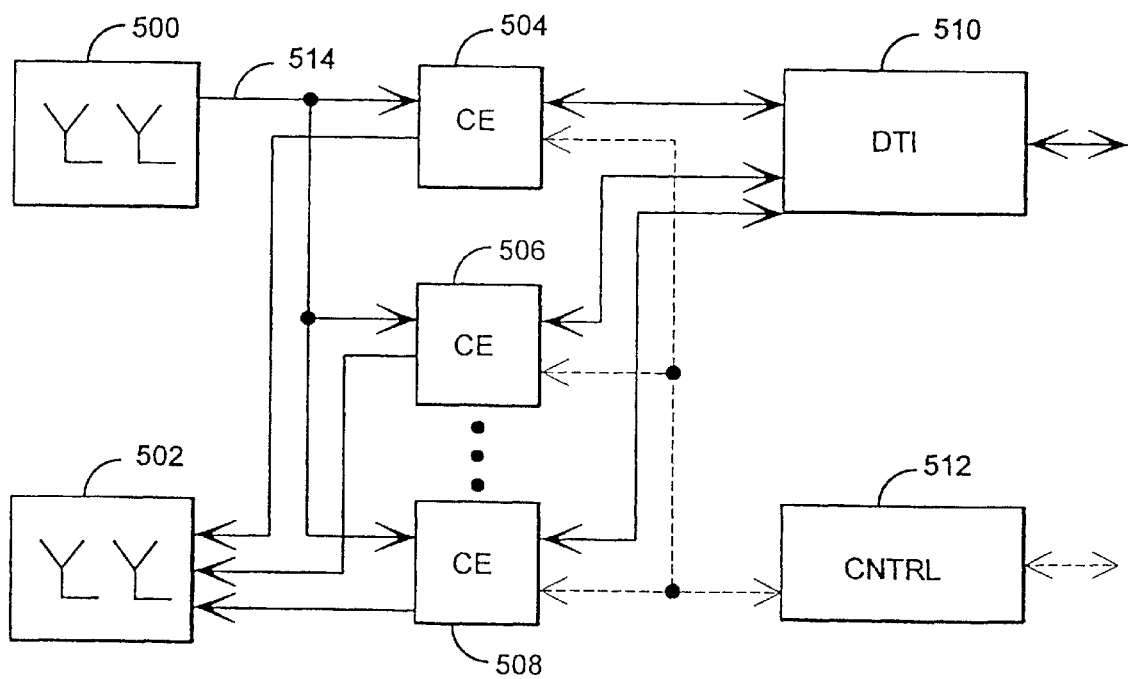
FIG. 6 is a block diagram illustrating a possible structure of a receiver according to the invention.

In the following, the structure of a base station equipment according to the first embodiment used in the cellular radio system according to the invention will be described. FIG. 6 is a block diagram illustrating the structure of equipment according to the invention. The equipment comprises an antenna group 500 consisting of L separate antenna elements. The antenna group may be linear, planar (two-dimensional) or omnidirectional. The antenna group 500 receives a multipath-propagated signal that is delayed in different ways from several different directions from each mobile station with each of the L elements, performs the preamplification, converts the signal into an intermediate frequency and digitizes all the L signals. The obtained L digital complex I,Q samples 514 are supplied into an input of channel elements 504, 506, 508.

Each active mobile station communicating with the base station is serviced by one channel element, which performs digital signal processing both on the received signal and on the signal to be transmitted, as will be described in greater detail below. Each channel element comprises a (α, τ) receiver and a corresponding transmitter. The digital shaping functions of the antenna beam, realized by means of signal phasing, are performed in a channel element both in the transmission direction and in the direction of reception.

In the direction of reception, a channel element filters the signal in the angle-space domain, demodulates the received signal components, combines them in a diversity combiner, and, in the end, decodes the signal that has been received from the mobile station and that has been combined. The obtained user data bits are supplied further to a baseband unit 510, which forwards them to other parts of the network.

In the transmission direction, the user data bits arrive from the other parts of the network to the baseband unit 510, which forwards them to the correct channel element 504 to 508 where they are encoded, modulated by a spreading code and subjected to the phasing of the signal to be transmitted, the phasing determining the directions of the antenna beams to be transmitted. The obtained L signals are supplied to each of the L elements of the antenna group 502. In practice, the reception and transmission antenna groups 500, 502 may be either separate, or implemented by means of the same physical antenna group, where the directions of transmission and reception are separated with suitable duplex filtration.

In the transmission antenna group 502, the signals that have arrived from each channel element and that are intended to be transmitted by each antenna element are converted into analog form, transferred to a radio frequency and transmitted via the respective antenna elements.

In the arrangement according to the invention, the transmission and reception antenna groups may naturally comprise a different number of antenna elements, even though the description above discloses the same number L of elements in each group for the sake of simplicity. The figure also shows a control block 512, which controls the operation of the respective units of the equipment, such as the allocation of the channel units to different connections according to messages from a respective base station controller.

Figure 7:
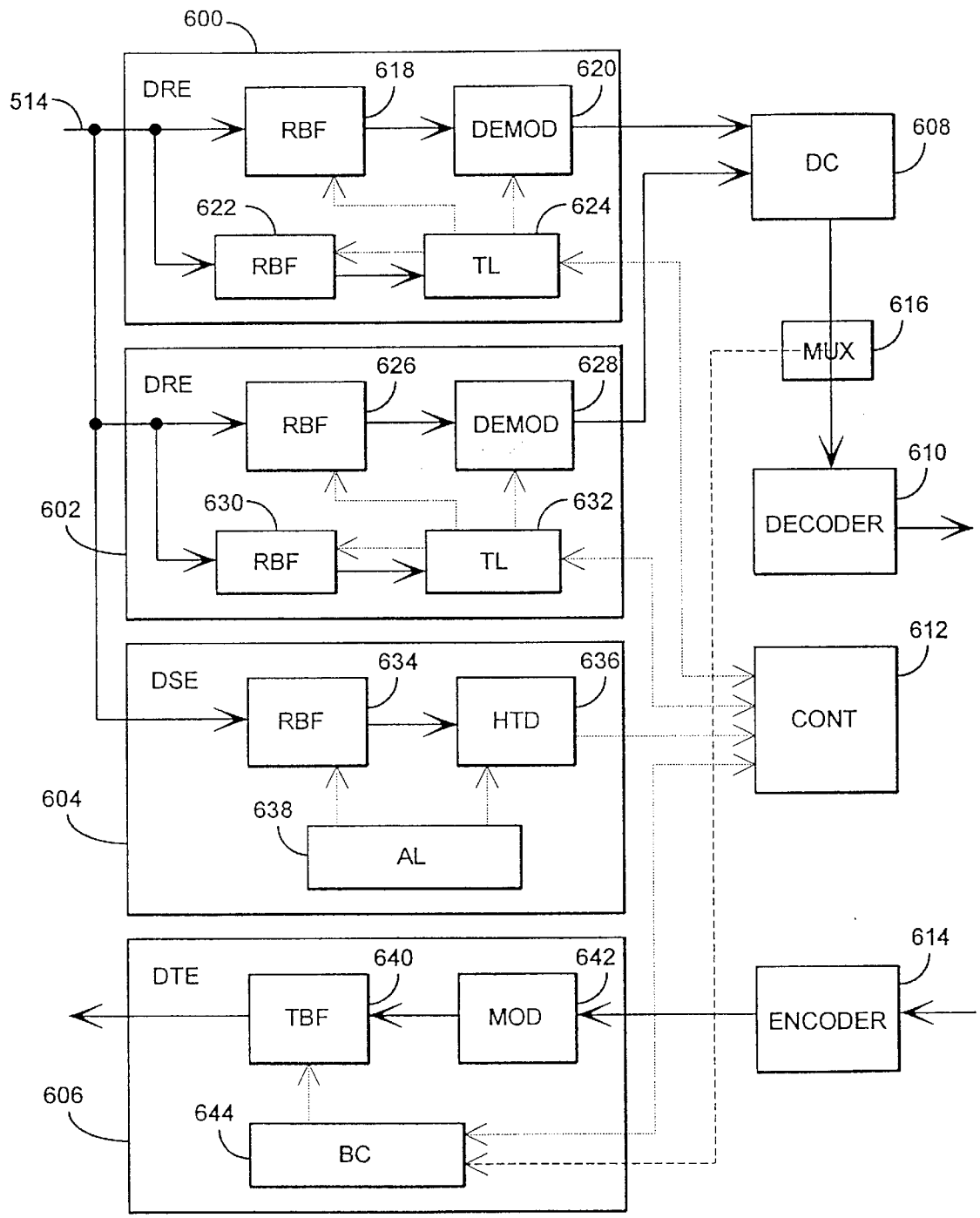
FIG. 7 is a block diagram illustrating an example of the structure of an individual channel element.

FIG. 7 is a block diagram illustrating the structure of a channel element in the equipment according to the first embodiment of the invention. The channel element comprises one or several digital receiver units 600, 602, two of which are shown in the figure, one or several searcher units 604, one of which is shown in the figure, a diversity combiner 608 the input of which comprises a signal from the receiver units, a decoder 610, to the input of which a signal that is sensible at the output of the diversity combiner 608 is connected, and control means 612. The L digital complex I,Q samples 514 arriving from the antenna group are supplied to the input of all the digital receiver units 600, 602 and searcher units 604. If the arrangement according to the invention is applied in a transmitter-receiver, the transmitter-receiver according to the invention also comprises an encoder 614 and a digital transmission unit 606.

The operation of the digital searcher unit 604 is examined first with reference to FIG. 7. In the same way as in a conventional rake receiver, the function of the searcher unit is to search for the desired signal components from the received signal. In the arrangement according to the invention, a new type of searcher unit continuously monitors the received signal in the ($\alpha$, $\tau$) domain and searches for useful signal components and gives their parameters, i.e. the angle of arrival (AoA) and the delay profile, to the control means 612, which in turn allocate a required number of receiver units for demodulating the best components. The receiver according to the invention can naturally also be implemented in such a way that a channel element does not comprise separate control means 612, but the searcher unit 604 forwards the information concerning the signal components to be monitored directly to the receiver branches 600, 602.

The searcher unit comprises means 634 for phasing the signal supplied from the radio-frequency parts of the antenna group, and means 636 for detecting whether the signal obtained from the output of the phasing means 634 comprises a signal component received with the given delay and for measuring the quality of this signal component. The searcher unit further comprises means 638 for controlling the aforementioned phasing means 634 and the measuring means 636 in such a way that the incoming directions and delays of the received signal can be measured.

The means 634 for phasing the signal supplied from the radio-frequency parts of the antenna group can be implemented, for example with equipment of the type described above and shown in FIG. 4, the equipment comprising means for providing the multiplication of the signal with complex coefficients $w_i$ (i=1, . . . ,L) by means of which it is possible to determine the angle of arrival of the signal that is notably amplified in the output signal of the phasing means. Each combination of the coefficients corresponds to a certain combination of antenna beams, as described above. The phasing means (634) are controlled by the means 638 so that all the essential incoming directions of the signal can be examined.

The output of the phasing means thus shows a signal that corresponds to the signal received from a given direction on the basis of the control of the means 638. The measuring means 636 perform a measurement with different delays on a signal which is sensible at the output of the phasing means, the purpose of the measurement being to detect the signal components that have different delays. The delay to be measured each time is set with the aforementioned means 638. In the measuring means, the signal situated at the input of the means is subjected to despreading, measurement of the complex signal energy and squaring of the energy for example over the coherence time of the channel, and comparison of the obtained measurement result with a given threshold value. The parameters of the measured signal components having a strength exceeding the given threshold value, i.e. the angle of arrival, delay and power, are provided to the control means 612 of the channel element.

The means 638 thus control the operation of the phasing means 634 and the measuring means. The means 638 correspond to a synchronization loop provided in the searcher branch of a conventional rake receiver, even though in the arrangement according to the invention the means operate in a new manner. The search for the desired signal components from the ($\alpha$, $\tau$) domain can be implemented in many ways under the control of the means 638. As stated above, the measurement of the signal power can be replaced with some other measurement of the signal quality.

The digitized signal received by the antenna group can be phased in the phasing means 634 step by step in such a way that the bearing of the greatest gain is changed with given angular intervals. From among the possible incoming directions, one selects a representative group of angles of arrival $\alpha_j$ which are situated at desired angular intervals from one another, and each incoming direction is subjected to several energy measurements at different delay values, whereby a delay profile $\tau_k$ is obtained for the incoming directions.

Another way is to direct the measuring means 636 to first measure the delay profile $\tau_k$ of the received signal, for example with a non-directional antenna pattern. The possible delays with which signal components are received are thus detected. The phasing means 634 are thereafter directed to sweep the different direction with a narrow directional beam, and the measuring means are simultaneously guided to measure with the aforementioned delay values detected in the first measurement. The incoming directions $\alpha_j$ of the components that have arrived with different delays are thus obtained.

The parameters of the detected signal components are thus given to the control means 612 of the channel element. The control means allocate the receiver elements 600, 602 to receive and demodulate the best detected signal components by informing the receiver element of the incoming direction and delay of the signal component. As stated above, the receiver elements can also be controlled directly by the searcher unit 604 without separate control means.

The operation of the digital receiver unit 600, will be examined next with reference to FIG. 7. In the same way as in a conventional rake receiver, the function of the receiver unit is to receive and demodulate a given signal component. Assume that the control means 612 of the channel element have allocated a receiver unit to receive a particular signal component the parameters of which are the angle of arrival $\alpha_j$ and the delay $\tau_k$.

The receiver unit 600, 602 comprises monitoring means 624, 632 to which the control means 612 of the channel element forward the information about the phase and incoming direction of the signal component to be monitored. The monitoring means control the first phasing means of the receiver unit the input of which is the digitized signal obtained from the antenna group. The phasing means 618, 626 have a similar structure as the phasing means 634 provided in the searcher unit. On the basis of the information that concerns the angle of arrival $\alpha_j$ and that is received from the control unit, the monitoring means set the complex weighting coefficients $w_i$ (i=1, . . . ,L) in such a way that a signal arriving from the desired incoming direction is visible at the output of the phasing means. This can thus be understood as a receiver antenna beam pointing in the desired direction and having a predetermined shape.

The receiver unit 600, 602 further comprises demodulation means 620, 628 the input of which comprises a signal obtained from the phasing means 618, 626. The monitoring means 624, 632 guide the demodulation means to synchronize with a signal component arriving with a given delay $\tau_k$. In the demodulation means, the signal is subjected to despreading and demodulation according to known technology, using the given $\tau_k$ as the code phase. The obtained symbols are supplied to the other parts of the channel element together with the delay data.

The receiver unit 600, 602 further comprises second phasing means 622, 630 the input of which comprises a digitized signal obtained from the antenna group. The output signal of the second phasing means is supplied to the monitoring means 624, 632. The monitoring means control the operation of the second phasing means by measuring with the means the environment of the current parameters $(\alpha_j, \tau_k)$ of the signal component allocated to the receiver in order to detect possible changes in the incoming direction and delay of the received signal component. For this purpose, the second phasing means comprise complex coefficients similar to the first phasing means for phasing the signal, and means similar to the measuring means 636 situated in the searcher unit for measuring the impulse response. If the monitoring means detect, by means of the second phasing means, changes in the incoming direction $\alpha_j$ or delay $\tau_k$ of the desired signal component, they update this data to the first phasing means and to the demodulation means.

The prior art discloses several manners in which the monitoring means 624, 632 can be implemented in a spread spectrum system, for example Early-Late gates that can be used in the arrangement according to the invention. These circuits estimate the code timing error by performing two energy measurements with the given time difference $\Delta\tau$, which is typically a fraction of the chip time of the spreading code in the environment of the current set point $\tau_k$. The energy measurements are performed with the measuring means of the second phasing means 622, 630, which provide the correction data required by the nominal set point $\tau_k$ as the delay changes.

Correspondingly, changes in the angle of arrival a of the signal can be monitored by means of the second phasing means. It is, for example, possible to perform, with the given delay $\tau_k$, two or more energy measurements with antenna beams which have been deflected by an angle $\Delta\alpha$ in both directions from the current angle of arrival $\alpha_j$ by means of phasing. The degree of the deflection $\Delta\alpha$ used is typically a fraction of the width of the antenna beam.

The monitoring means 624, 632 thus control the energy measurements performed by the second phasing means 622, 630, so that a signal can be received with the greatest possible energy at all times. The monitoring means update the data about the changed parameters $(\alpha_j, \tau_k)$ to the first phasing means, to the demodulation means, and also to the control means 612 of the channel element, so that the data can be used in the transmission direction, if required.

The above-described maximization of the received signal can be compared with the receiver antenna diversity used in conventional systems, wherein a signal is received with two or more antennas situated from each other at a distance having the length of several wavelengths of the received signal. In the receiver according to the invention, if a signal received with the angle of arrival $\alpha_j$ is caught in a deep and long fading situation, the fading can probably be eliminated by changing the angle of the receiver beam by a small angle $\Delta\alpha$. There is thus no need for two separate antennas situated at a given distance from each other.

The operation of the diversity combiner 608 and the decoder 610 of the channel element is similar as in the prior art diversity receivers. The combiner 608 combines the symbol sequences arriving from the different receiver elements by taking into account and compensating for their different delays $\tau_k$ and possibly by weighting the different symbol sequences according to their signal-to-noise ratios in order to obtain a maximum ratio combination. The combined symbol sequence thus obtained is supplied to the decoder 610, which decodes the symbols to user data bits, usually performing the deinterleaving first. The CDMA applications generally use a strong convolutional coding, for which the best method of detection is the Viterbi algorithm providing a soft decision.

It is clear that the above-described channel element can also be used for monitoring and receiving an access channel. The antenna beams used in the direction of reception then have wider antenna patterns, i.e. they can be, for example, 120° wide, since the exact location of the mobile stations transmitting call-set-up messages is not known.

The operation of the digital transmission unit 606 will be examined next with reference to FIG. 7. The user data bits are first supplied to the encoder 614, which encodes the bits typically with a convolutional code and performs interleaving on the encoded symbols. The obtained interleaved symbols are applied to a spread spectrum modulator 642, which performs conventional modulation. All the above-described functions can be performed according to known technology.

In the present invention, the transmission unit comprises means 644, 640, however, for controlling and phasing digitally the signal to be transmitted in response to the received signal. In the transmission unit according to the invention, the means 644 for adjusting the transmission beam receive from the control means 612 of the channel element information in their input about the incoming directions used in the different receiver units 600, 602 for receiving a signal from the mobile station. The control means 612 may also report the other incoming directions of the signal detected by the searcher unit 604, but not all the directions are necessarily used in the reception of the signal.

The means 644 of the transmission unit for adjusting the transmission beam control the phasing means 640, which calculate from predetermined beam-forming functions J×L a complex weighting coefficient $w_{ij}$ (i=1, . . . L; j=1, . . . ,J) which produces J antenna beams by means of L antenna elements. In addition to the direction and number of the antenna beams, the means 644 control the phasing means 640 by indicating the transmission power that is to be used with each beam and that the means 644 obtain from the control means 612 of the channel element.

The structure of the phasing means 640 may be similar to the phasing means 618, 626, 634 described above for the direction of reception. In the phasing means, the digitized (I,Q) samples of the outbound signal supplied from the modulation means 642 are thus multiplied by L complex weighting coefficients where L is the number of the antenna elements, as follows:

$$v_i = \sum_{j=1}^{J} g_j w_{ij}, i = 1, \ldots, L$$

whereby L complex sample sequences are obtained for the antenna group. The complex multiplication also uses a real scaling factor $g_j$ (j=1, . . . ,J), which is obtained from the adjusting means 644, and which can-be used for the independent power adjustment of each antenna beam. The adjusting means 644 also indicate the frequency to be used, so that the weighting coefficients $w_{ij}$ can be set correctly.

The arrangement according to the invention can also use special beam control bits that a mobile station generates on the basis of the signal it has received and that it adds to the signal it transmits to the base station. The receiver according to the invention comprises means 616 for demultiplexing and detecting these beam control bits from the received signal. The detection should be performed already, before the decoder 610, in order to avoid delays. The beam control bits are forwarded to the adjusting means 644 of the transmission unit.

The means 644 for adjusting the transmission beam control the phasing means 640 on the basis of the information obtained from the control means of the channel element and the beam control bits transmitted by the mobile station. The adjustment can be performed in many ways by modifying the parameters $\alpha_j$ and $g_j$ (j=1, . . . ,J) in different ways. For example, the transmit power used with some antenna beams can be independently adjusted, or the direction angle $\alpha_j$ of some antenna beams can be changed by a given angle $\Delta \alpha$, or the number of the antenna. beams used can be altered. With these measures it is possible to compensate for the deteriorations of signal quality, such as fadings, occurring over the radio path.

In the arrangement according to the invention, the adjusting means 644 of the transmission unit 606 can deflect the direction of one or several of the used antenna beams by small degrees $\Delta \alpha$ in the environment of the given direction angle $\alpha_j$. Due to such deflection, it is possible to reduce the. likelihood that the mobile station will be in a deep fading for a long time. Since the directional angle of an antenna beam continuously vibrates around a nominal directional angle $\alpha_j$, a signal that has propagated over the radio path does not continuously use the same route. This method can be considered a new type of antenna diversity in the downlink direction.

In the arrangement according to the invention, the adjusting means 644 control the phasing means 640 in such a way that with the suitable adjustment of the weighting coefficients $w_{ij}$ (i=1, . . . ,L; j=1, . . . ,J) and the factors $g_j$ (j=1, . . . ,J), one or several signals having a rather narrow antenna beam are obtained from the transmitting antenna group, the angle of the greatest gain of the signal sweeping the cell area continuously. The antenna pattern thus obtained is used for the transmission of the pilot signal. The adjusting means 644 may control the phasing means 640 also in such a way that the pilot channel is transmitted by use of several rotating narrow beams simultaneously.

Even though the invention is described above with reference to the example according to the accompanying drawings, it is clear that the invention is not restricted thereto, but it can be modified in many ways within the scope of the concept covered by the appended claims.

The method according to the invention can also be implemented in the uplink transmission direction. The mobile station then transmits a long transmission burst on the access channel, and the base station uses in the reception a rotating antenna beam, which detects this transmission. With this arrangement the number of the channel elements needed on the access channel can be reduced at the base station. By means of the arrangement, the same antenna gain can be used on the access channel as on the traffic channel. This results in the fact that the terminal equipment does not have to use a high transmission power when transmitting a call set-up message, whereby the interference caused in the other connections is reduced.

The alignment of the antenna beams can be used, for example, in both the vertical and the horizontal direction, whereby the above-described ($\alpha$, $\tau$) domain can be understood as an ($\alpha$, $\beta$, $\tau$) domain, wherein $\alpha$ is the vertical angle, $\beta$ is the horizontal angle and $\tau$ is the delay.

One possibility is to utilize coherent, incoherent or differentially coherent modulation and demodulation methods in the channel elements. For example, in order to enable coherent demodulation in a mobile station, the base station may include known reference symbols in each antenna beam as a phase reference.

One alternative embodiment of the invention includes positioning the digital phasing means 618 to 634 of the channel elements in one common phasing means block, which services all channel elements.

We claim:

1. A method for transmitting a pilot signal in a cellular radio system, which has in each of a plurality of cells at least one base station communicating with mobile stations located within a respective cell area, comprising:

said base stations each transmitting a data signal in a downlink transmission direction by using radiation patterns that change in time;

said base stations each transmitting a respective pilot signal on a respective common control channel to respective mobile stations;

in transmitting said respective pilot signal, each base station using at least one narrow, changing antenna beam having an angle of greatest gain; and each base station, in transmitting said respective pilot signal, directing said angle of greatest gain of each respective antenna beam in such a way that said respective antenna beam sweeps said respective cell areas the sweeping of the beam is synchronized to a frame structure of each said base station.

2. The method according to claim 1, wherein each said base station, in transmitting said respective pilot signal using at least one narrow, changing antenna beam, uses more than one said antenna beam.

3. The method according to claim 2, wherein during said transmitting of each said pilot signal, said angles of greatest gain of said respective antenna beams from each said base station point in different directions at each moment.

4. The method according to claim 1, further comprising:

each said base station transmitting to said mobile stations located within said respective cell area, information about the time when a respective at least one antenna beam on which said respective pilot channel is being transmitted sweeps at least one sector of said respective cell area.

5. The method according to claim 1, further comprising:

at least one base station receiving a signal from a respective said mobile station as a plurality of signal components, from a plurality of incoming directions and subject to a plurality of delays by use of an antenna group having a plurality of elements; and each said at least one base station searching for said respective incoming directions and said respective delays of said respective signal components; and each said at least one base station transmitting a data signal to a respective said mobile station by use of a respective antenna group having a plurality of elements, and, in connection with such transmitting, controlling formation of a respective radiation pattern on the basis of results of said searching.

6. The method according to claim 1, further comprising:

controlling said antenna beams used for transmitting said respective pilot signals of those of said base stations which are adjacent to one another in such a way that said respective antenna beams do not overlap in angle of greatest gain at any moment.

7. The method according to claim 1, wherein said cellular radio system has general timing, said method further comprising:

synchronizing control of said antenna beams with said general timing.

8. The method according to claim 1, wherein the sweeping of the beam is synchronized between said cells and sectors of said cell area.

9. A cellular radio system, comprising:

in each of a plurality of cells, there being at least one base station arranged for communicating with a plurality of respective mobile stations located within a respective cell area;

said base stations each being arranged to transmit a respective pilot signal on a common control channel to said respective mobile stations;

at least one of said base stations being arranged to transmit to said respective mobile stations using radiation patterns that change in time;

said at least one base station comprising a transmitter. which transmits said respective pilot signal as at least one narrow, changing antenna beam having an angle of greatest gain; and each said at least one said base station including a controller, which controls said respective angle of greatest gain of each respective said antenna beam in such a way that said respective antenna beam sweeps said respective cell area, the sweeping of the antenna beam is synchronized to a frame structure of each said at least one said base station.

10. The cellular radio system according to claim 9, wherein each said at least one base station further comprises:

at least one antenna group having a plurality of elements;

a group of radio-frequency parts functionally connected to said at least one antenna group;

at least one channel unit functionally connected to said radio-frequency parts, each said channel unit comprising a phaser, which phases said respective signal to be transmitted, with said at least one antenna group, so that gain obtained from said at least one antenna group is greatest in a direction towards a respective said mobile station.

11. The cellular radio system according to claim 9, wherein each said base station further comprises:

a transmitter which transmits to said respective mobile stations, information about the time when said respective at least one antenna beam on which said respective pilot channel is being transmitted sweeps at least one sector of said respective cell area.

12. The cellular radio system according to claim 9, wherein the sweeping of the beam is synchronized between said cells and sectors of said cell area.

* * * * *